Nov. 4, 1941.     C. G. JONES     2,261,684
METHOD AND APPARATUS FOR WELDING
Filed Feb. 23, 1939     3 Sheets—Sheet 1
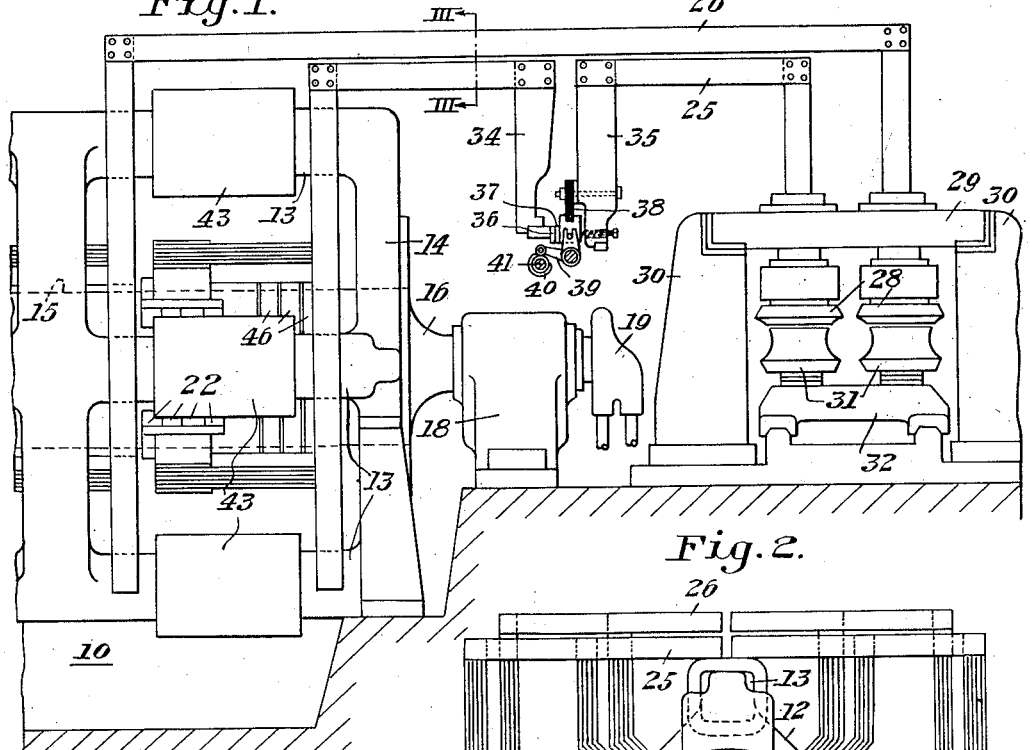
Fig. 1.
Fig. 2.
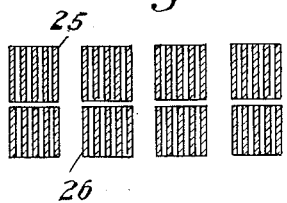
Fig. 3.
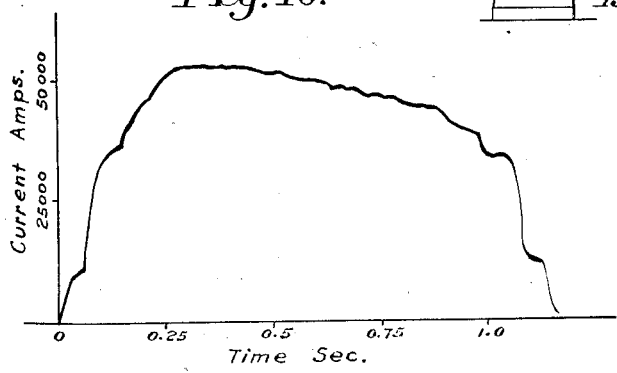
Fig. 10.
INVENTOR
Carl G. Jones
by his attorneys
Stebbins, Blenko & Parmelee

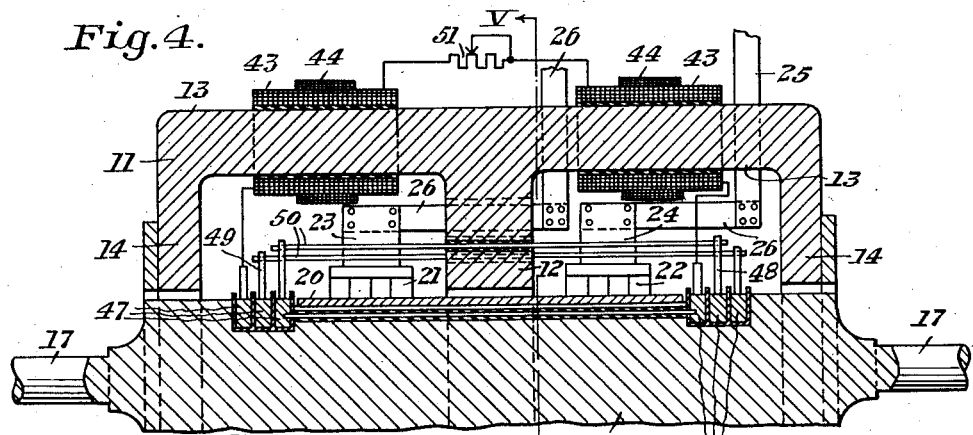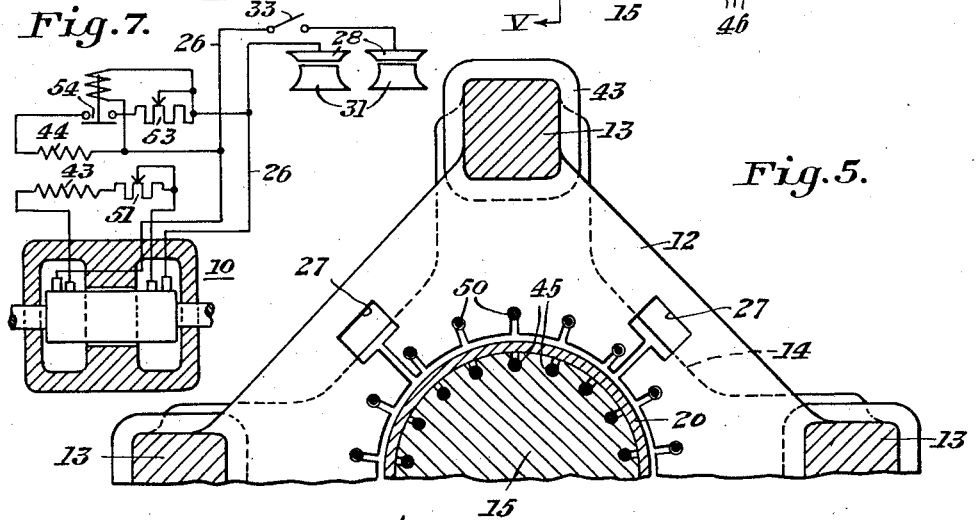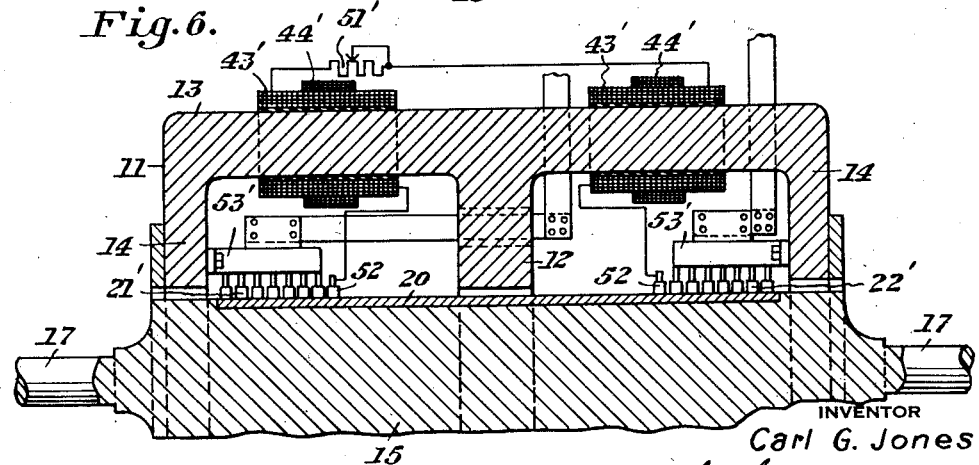

Nov. 4, 1941.　　C. G. JONES　　2,261,684
METHOD AND APPARATUS FOR WELDING
Filed Feb. 23, 1939　　3 Sheets-Sheet 3

INVENTOR
Carl G. Jones
by his attorneys
Stebbins, Blenko & Parmelee

Patented Nov. 4, 1941

2,261,684

UNITED STATES PATENT OFFICE 2,261,684

METHOD AND APPARATUS FOR WELDING

Carl G. Jones, Youngstown, Ohio, assignor to The Youngstown Sheet and Tube Company, Youngstown, Ohio, a corporation of Ohio Application February 23, 1939, Serial No. 257,862

3 Claims. (Cl. 219—6)

My invention relates to welding and, in particular, to the continuous welding of metallic lengths by the resistance method, or a combination of the flash and resistance methods.

This is a continuation in part of my application Serial No. 23,856, filed May 28, 1935, for Electric generator, which was divided from my application for Patent 2,087,227.

Alternating current has been widely used for electric welding with considerable success. The advantage of alternating current is that the necessary control operations can be effected on the high voltage side of step-down transformers supplying the welding current. Because of the smaller current on the high voltage side of the transformers, the problems of control are not serious. An objection to alternating current for welding, however, is that the weld is not absolutely uniform, but tends to follow the variations of the current alternations.

It has not been thought possible heretofore to use direct currents of any considerable magnitude for electric welding because of the difficulties involved in the generation and control of large direct currents. Direct-current generators of the shunt or compound type particularly, are unsuited to electric welding, first, because the commutation of heavy currents is attended with great difficulty, and second, because the shunt generator has a drooping voltage characteristic and it is not practical to provide a series or compound winding of sufficient size to carry the large currents necessary for welding through a compound winding to overcome the drooping characteristic of the shunt generator in the known manner. The drooping characteristic of a shunt generator would be even more noticeable when the generator is connected to a welding load, than otherwise, because of the large currents required.

Another and perhaps more serious difficulty attendant upon the use of direct current for welding is the control of the heavy currents required. It has been proposed heretofore to control these currents indirectly by controlling the excitation of the generators producing them. This is somewhat similar to the idea of controlling alternating welding current on the high-voltage side of the welding transformers, but is objectionable because of the time lag involved. The voltage required for welding is usually comparatively low and this fact further militates against self-excitation of the generator, since generator field windings are usually wound for a voltage higher than that generally employed in welding.

I have invented a method and apparatus adapted for electric welding which makes it possible to use direct current satisfactorily and, at the same time, to overcome the above-mentioned objections existent heretofore. In a preferred embodiment of the invention, I provide a direct-current generator capable of generating large currents at relatively low voltage. I preferably employ a generator of the homopolar type. The generator has exciting windings for producing the necessary electromagnetic field and these windings are excited by current induced in the generator armature on rotation thereof, either in the same means which induces the main power or welding current, or in a separate inducing means supplying current to the exciting windings only. The power terminals of the generator are brought out adjacent one end thereof and leads of opposite polarity extend in closely spaced, superposed relation from the generator terminals to a pair of welding electrodes adapted to progressively engage the continuously advancing material to be welded. In the present description, I shall explain the invention as applied to the welding of tubular blanks to form pipe, and the electrodes are preferably a pair of grooved discs disposed substantially at the same horizontal level with their axes substantially parallel and vertical.

I provide a multiple contact switch in the main welding circuit adapted to close and open to initiate and terminate the flow of welding current. The field windings of the generator are excited continuously so that there is no delay in the starting of the welding operation.

I also provide a system for automatically controlling the generator excitation so as to maintain the proper welding voltage at all times and, at the same time, effective to cause the building up of the generator voltage promptly by over-excitation of the field during the starting period.

For a complete understanding of the invention, reference is made to the accompanying drawings illustrating a present preferred embodiment of the invention and the method of its practice and certain modifications thereof. In the drawings:

Fig. 1 is a side elevation with parts in section showing a portion of the generator, the welding electrodes, and the connecting circuit and control switch therebetween;

Fig. 2 is an end elevation of the generator from the left thereof as shown in Fig. 1;

Fig. 3 is a partial sectional view along the line

Figure 8:
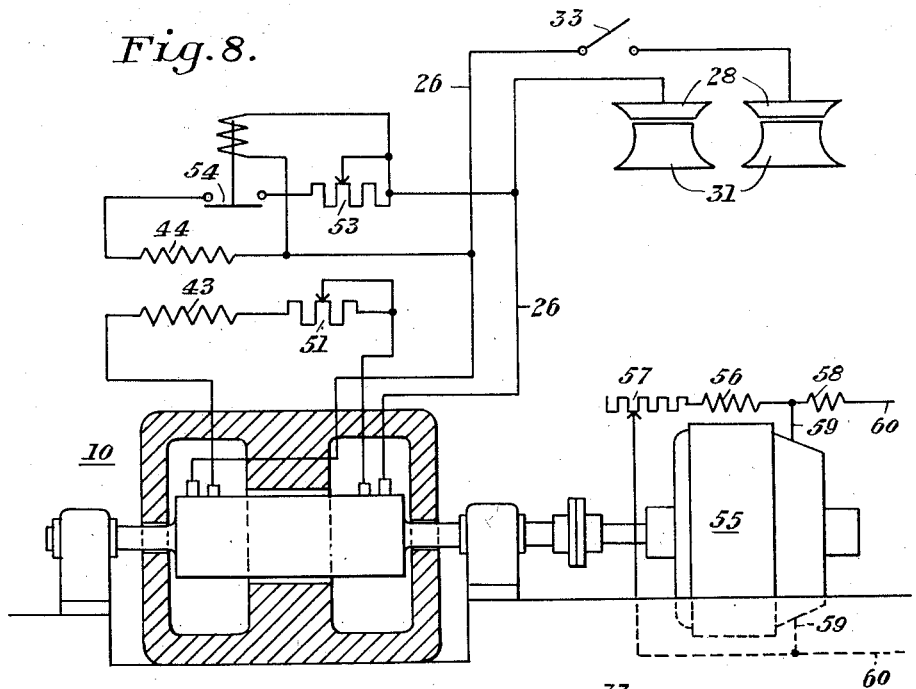
Figure 9:
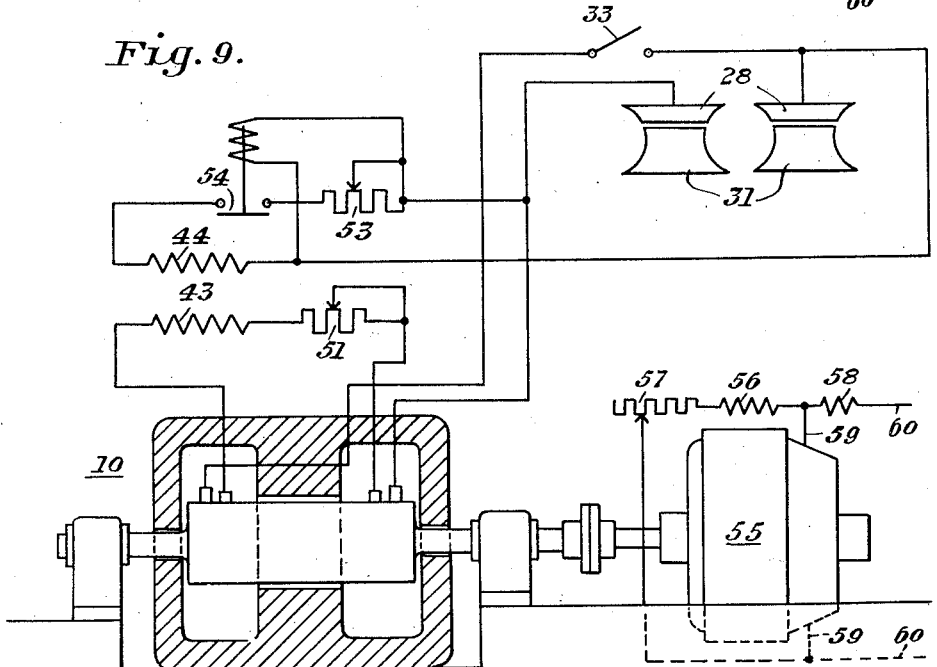

III—III of Fig. 1, illustrating a detail of the connecting circuit;

Fig. 4 is a vertical axial section through the generator, certain parts being rotated from their normal position into the plane of section for the sake of clearness;

Fig. 5 is a sectional view along the line V—V of Fig. 4;

Fig. 6 is a sectional view similar to Fig. 4 showing a modification;

Fig. 7 is a schematic diagram of connections illustrating the automatic control of the excitation to maintain the desired welding voltage and provide for accelerated building up of the welding voltage when starting;

Figs. 8 and 9 are similar to Fig. 7, showing modified forms of connections; and

Fig. 10 is an oscillogram of the current through the generator when the main switch is closed on a short circuit and then reopened.

Referring now in detail to the drawings, the generator 10 has a frame 11 composed of a central annular yoke 12 and arms 13 extending axially thereof. The arms 13 merge into end rings 14. An armature 15 extends axially of the yoke and end rings for rotation therein. The armature preferably is composed of cast steel and has journals 17 formed thereon for seating in bearings 18. Fluid supply means 19 are provided for cooling the armature. The armature 15 is provided with an inductor 20 which may be in the form of a conducting sleeve of copper, for example. Groups of brushes 21 and 22 are supported in any convenient manner adjacent opposite ends of the inductor and have sliding, conducting engagement therewith. As indicated in Fig. 2, there are groups of brushes of both polarities between each pair of adjacent arms 13. Terminals 23 and 24 extend radially from the brush groups 21 and 22, respectively. Leads 25 and 26 extend axially of the generator, as shown in Fig. 4, and then radially thereof, as shown in Fig. 2, the leads 26 from the terminals 23 extending through suitable openings 27 in the yoke 12.

As shown in Fig. 1, the terminals 25 and 26 extend radially of the generator sufficiently to clear the end rings and then laterally to a pair of welding electrodes 28 suspended for rotation in a horizontal plane from a crosshead 29 supported on housings 30. Pressure rolls 31 journaled vertically on a base 32, which is slidable horizontally relative to the housings 30, cooperate with the electrode rolls 28 to form a welding pass for tubular blanks having an axial seam cleft. The blanks are positioned before entering the welding pass so that the edges of the seam cleft engage the electrode rolls respectively.

A switch 33 is located adjacent the generator 10 and is connected in circuit with the leads 25. The switch 33 comprises a plurality of conducting blocks 34 and 35 to which the leads 25 are attached. The blocks 34 carry fixed contacts 36. The blocks 35 carry moving contacts 37 supported on resilient conducting straps 38 bolted to the blocks 35. Bell cranks 39 have a pin and clevis connection to the moving contacts 37 and rollers adapted to be engaged by cams 40 on a cam shaft 41. Rotation of the shaft 41, obviously causes angular movement of the bell cranks 39 and shifts the moving contacts 37 from engagement with their corresponding fixed contacts 36. A housing 42 encloses the working parts of the switch.

As indicated in Figs. 2 and 4, the leads 25 and 26 come out of the generator in close proximity and extend in closely spaced, superposed relation, from the generator to the welding electrodes. This arrangement of the leads reduces the inductance of the welding circuit and, therefore, shortens the time necessary for the welding current to build up to full value after the closing of the switch 33. The decay of the current after opening the switch is correspondingly accelerated.

The generator 10 is provided with field windings 43 embracing the arms 13 for inducing the field flux radially through the yoke 12 and axially of the armature 15. Auxiliary field coils 44 are also provided for a purpose to be explained later.

Referring particularly to Fig. 4, the armature 15 is provided, in addition to the inductor 20, for inducing the main power or welding current, with a plurality of inductors 45. These inductors are positioned in slotted holes extending axially of the armature and are insulated therefrom. Slip rings 46 and 47 are carried by the armature 15, insulated from each other and the armature. Brushes 48 and 49 cooperate with the slip rings, being supported in any convenient manner. Cross connections 50 extend between the brushes 48 and 49.

The inductors 45 are connected in series, in groups, by the slip rings, brushes and cross connections. It will be noted that the inner slip ring 46 is connected to the righthand field winding 43. The inner slip ring 47 is connected to the middle slip ring 46 by a cross connection 50. Similarly, the inductor 45 adjacent that shown in full lines in Fig. 4 is connected to the middle slip ring 46 and also to the middle slip ring 47. From the latter, a cross connection extends to the outer slip ring 46. The second inductor 45 from that shown in full lines in Fig. 4, is connected to the outer slip ring 46 and the outer slip ring 47. A connection extends from the latter to the lefthand field winding 43. The two field windings 43, shown in Fig. 4, are connected in series with a control rheostat 51.

From the foregoing, it will be apparent that three of the inductors 45 are connected in series to generate the voltage to send current through the windings 43. A three-turn armature winding is thus provided for each pair of exciting windings 43. A larger number of turns in the inducing winding could be employed by using additional slip rings and brushes. In this way, it is possible to obtain almost any desired voltage for the field windings.

The induction of the main power or welding current requires no explanation. It will be understood that the field flux extends radially from the yoke 12 to the armature 15 and axially thereof, returning to the yoke through the end blocks 16, rings 14 and arms 13. The rotation of the inductor 20 in the air gap between the yoke 12 and the armature 15 generates a voltage between the brushes 21 and 22, due to the movement of the elements of the inductor sleeve 20 through the flux crossing the air gap. Similarly, the inductors 45 induce the necessary exciting voltage.

A generator of the type shown at 10 has a high inductance because the inductor 20 embraces a substantial portion of the magnetic circuit. Tests on the generator show that it requires about two minutes for the generator voltage to build up to normal value (about 4.5 volts is a typical example) after the closure of excitation circuit. On reversal of the field, the generator voltage takes 30 seconds to fall to zero.

When using the apparatus of Fig. 1 for welding pipe, e. g., 12¾" O. D. pipe, 45' long, having a wall thickness of 0.203", the blank is fed through the welder at a speed of 90' per min. The blank must not enter or leave the welder while any appreciable voltage exists across the electrodes because of the injury to the latter resulting from burning. Since the entire length of the blank traverses the welder in 30 sec., it will be apparent that control of the welding current by varying the excitation is out of the question. This is the reason homopolar generators have not been used for welding heretofore, even though they are easily capable of producing the large current required.

The high inductance of homopolar generators, furthermore, renders the interruption of the full welding current exceedingly difficult since the inductance is comparable to the momentum of a moving body and tends to keep the current flowing even after the separation of the contacts of a switch in the circuit. This results in destructive arcing which soon renders the switch inoperative. Such difficulties have resulted in the use of alternating current almost exclusively for welding, even though the desirability of direct current was well recognized.

Tests show that the welding current reaches it full value of 145,000 amps. (for the pipe size and speed of travel mentioned) in 0.36 second from the time the switch closing mechanism (a fluid-pressure cylinder and piston) starts. Since the switch requires .13 second to close, the current actually builds up from zero to full value in from 0.25 to 0.30 second. (The switch contacts close sequentially, so a substantial current flow is established before the switch is finally closed.)

This rapid building up of the welding current is made possible by the low inductance of the circuit conductors connecting the generator and the electrodes. In the arrangement of apparatus shown in Figs. 1 and 2, the inductance of the bus structure 25, 26 is only about 800 cm., that of the generator about 2400 and that of the welding stand about 4000.

Fig. 10 shows the performance of one of the four groups of contacts of the switch 33 under short circuit conditions. As indicated, the current reached a maximum of 55,000 amps., 10% above the rated value.

The combination disclosed herein including a homopolar generator, a welder to which the generator is adapted to supply current, and connecting bus bars including a control switch, comprises a circuit which when closed, will have an inductance and resistance in such a ratio that the time required for the current to build up to 95% of its full final value will be less than 0.5 sec., and preferably not more than 0.3 or 0.4 sec. This desirable condition results from the particular generator structure, the small circuit loop through the switch, the arrangement of the bus bars, and the use of non-magnetic metal in certain parts of the welder itself. The loss involved by failure to effect a weld in that portion of the blank traversing the welder while the current is being built up to the welding value is thus reduced to 5" or 6", for the speed of travel previously mentioned. This is considerably less than the minimum obtained with other methods of welding pipe previously employed.

A modification of the invention is shown in Fig. 6. This modification is similar in general to that of Fig. 4, except as to the manner of obtaining the exciting current for energizing the field windings 43'. In the modification of Fig. 6, separate brushes 52 are supported in any convenient manner for engaging the inductor 20 in the same manner as the brushes 21 and 22. The brushes 21' and 22' of Fig. 6 are shown as supported on brackets 53. They could, of course, be positioned inside the brushes 52 at about the position indicated in Fig. 4. It will be obvious that the windings 43' must be designed for the voltage between the brushes 52 and will thus be composed of conductors of greater total cross-section than the windings 43, which are designed for a multiple of that voltage. The chief advantage of this modification is that the general construction is simpler than that of Fig. 4. In both forms of the generator, however, the voltage on the field changes very slightly on the application of full load to the generator. The machines have substantially the characteristics of separately excited generators, although they are obviously self-excited. The field voltage is not decreased because of an increased IR drop in the brushes and the sliding contacts, as the load is applied. A substantially uniform excitation is thus attained, regardless of the magnitude of the generator load.

Fig. 7 illustrates the voltage control system which I prefer to employ in connection with the apparatus described above. As shown in Fig. 7, the main field windings 43 are connected across a pair of brushes corresponding either to the outer brush 47 and the inner brush 46, or to the brushes 52. The auxiliary differential field windings 44 are connected in series with a control rheostat 53 across the leads 25 and 26. The windings 44, however, oppose the effect of the windings 43, since the corresponding ends of the windings, as shown in Fig. 7, are connected to opposite ends of the generator 10. A field relay 54 has its contact connected in series with the winding 44 and the rheostat 53, the winding of the relay being connected across the leads 25 and 26 for a purpose which will presently appear. The windings 43 and 44 are designed so that when the generator is operating under load, the net effect of the two will be sufficient to maintain the desired welding voltage. When the load on the generator is removed by the opening of the switch 33, there will be a tendency for the terminal voltage of the generator to rise. Any increase in the terminal voltage of the machine, however, would increase the energization of the bucking windings 44, which would tend to decrease the excitation and, therefore, the terminal voltage of the machine, maintains a substantially uniform voltage from full load to no load. The reverse occurs on application of the load, that is, the tendency for the terminal voltage of the machine to drop is compensated for by the decreased excitation of the bucking windings 44. The relay 54 is designed to hold its contact closed when the voltage across the terminals 25, 26 exceeds a predetermined value, in the neighborhood of normal operating voltage.

When the generator 10 is being started out from rest, being driven by a variable speed motor or other suitable source of power, there will initially be no voltage across the leads 25 and 26. The contacts of the relay 54 will therefore be open, opening the circuit of the bucking field windings 44. As the generator armature is accelerated to normal speed, the residual magnetism of the yoke 12 will induce a slight voltage between the brushes to which the windings 43 are connected. Since all the turns of the windings 43 are now effective, the windings 44 being disconnected, the normal voltage of the machine develops rapidly and, when substantially normal voltage has been reached, the relay 54 operates to energize the windings 44 to prevent over-excitation of the generator.

In accordance with my invention, I advance metal lengths, such as tube blanks to be welded, into engagement with the electrodes 28 while the switch 33 is open, the generator being driven at normal speed, fully excited. Under these conditions, normal welding voltage exists across the generator leads. On closing the switch 33, welding current builds up almost instantaneously, viz., in 0.36 sec., to substantially the full welding value, e. g., 145,000 amps. The importance of the prompt building up of the welding current, of course, is that the blanks must be moved forward at a more or less uniform rate, and the higher the rate, the greater the output per day and the better the weld. Any delay in building up the welding current, therefore, increases the "end scrap loss," that is, the portion of the blank at either end thereof which is not welded, because it is necessary to start the welding current only after the electrodes have engaged the work and to terminate the current before the work leaves the electrodes to prevent injuring the electrodes.

The welding current is reduced to zero in about 0.6 sec. after the opening of the switch 33. This means that the pipe can be welded to a point nearer the trailing end than has ever been possible previously. The closing and opening of the switch 33 may conveniently be effected automatically by control devices such as electric switches operated by the advancing blank at certain points in its path. After the welding of one pipe length, the generator 10 continues to maintain its voltage whereby full welding current will be caused to flow on the next closure of the switch after a succeeding blank has entered the welder.

Fig. 8 illustrates a schematic diagram similar to Fig. 7 showing the generator 10 driven by a variable speed motor, for example, a direct-current motor 55 having a shunt field winding 56, a field rheostat 57 and a series field winding 58. The armature leads indicated at 59 and the shunt field circuit are connected to a direct-current source indicated at 60.

The variable speed motor 55 driving the generator 10 permits the generated voltage to be controlled by varying the speed at which the generator is driven. The possibility of reducing the generator speed under certain conditions, furthermore, avoids a certain amount of brush wear which would be encountered if a constant speed motor were employed.

Fig. 9 is similar to Fig. 8 except that the bucking field winding 44, instead of being connected across the generator 10, has one end connected to one generator terminal and the other end connected to the main lead 25 at a point beyond the switch 33 and is thus effective only when the switch is closed. This occurs, of course, only after the tube is in contact with the electrodes.

The open circuit voltage across the generator will naturally be somewhat higher than the welding voltage proper. Thus when the switch 33 is closed and the relay 54 is adjusted for a slight delay in closing, a temporary over-voltage will be available in the system shown in Fig. 9 to hasten the rise of the welding current to full value. For this reason, the scheme of connections shown in Fig. 9 is preferred to that of Fig. 8 since it will cause quicker heating of the stock being welded. The system of Fig. 8 tends to maintain a constant voltage regardless of the load on the generator.

It will be apparent from the foregoing description that my invention makes possible the use of direct current for welding heavy material at a high rate of speed. The homopolar generator is well adapted to the delivery of large currents at low voltage. According to my invention, furthermore, the generator is self-excited, avoiding the necessity for a separate generator or other source of exciting current. At the same time, the characteristics of the generator of my invention are substantially those of a separately excited machine. By maintaining the generator voltage constant during welding, welding current is initiated with a minimum delay, reducing the end scrap loss to a substantially negligible amount. The arrangement of the conductors forming the welding circuit between the generator and the electrodes further reduces the delay in building up the welding current.

Quick initiation and termination of the welding current are a major economic consideration as welding speeds are increased. Such increase in welding speed is desirable because it results in a greater production, a greatly improved metallurgical structure of the weld for speeds above 100' per minute and a reduction in the consumption of electric energy in watts per foot, which varies inversely with the welding speed. But for the present invention, high speed welding would be uneconomic because of the large crop-end loss which is proportional to the time required for the welding current to build up to its full value.

The generated voltage changes very little from no load to full load because the exciting current is either derived from a separate armature winding or collected from the armature directly and not through the main power brushes. The field current is thus not greatly affected by the flow of the power current. The differential field windings provide substantially the characteristics of a cumulative compound generator since they maintain the terminal voltage substantially the same at no load and full load. These windings also tend to overcome the effect of any tendency of the terminal voltage to drop on closing of the main switch, thus further accelerating the building up of the welding current to its full value. There is no time lag involved as in the case of mechanically operated correcting devices. The correction commences as soon as the load is applied.

Although I have illustrated and described herein but one preferred embodiment of the invention and method of its practice, with some modifications thereof, it will be apparent that numerous changes in the construction and operation described may be made without departing from the spirit of the invention or the scope of the appended claims.

I claim:

1. An electrical system for supplying current to welding apparatus comprising a pair of electrodes past which are moved formed pipe blanks of limited length having a longitudinal seam cleft at such speed as to require a current of over 100,000 amperes to weld the edges of said cleft continuously, said system including a homopolar generator adjacent said electrodes capable of delivering said current, a circuit connecting said electrodes and generator, a switch in said circuit having a plurality of sequentially-engaging, cooperating contacts capable of interrupting said current after the welding of each blank, the conductors of said circuit being short and direct and the conductors of opposite polarity being disposed in closely spaced side-by-side relation substantially throughout their length, establishing in said circuit a ratio of inductance to resistance such as to cause the welding current to build up to 95% of its ultimate value in less than 0.5 second after the closing of said switch, whereby the weld may be started very close to the end of the blank and end scrap loss materially reduced.

2. An electrical system for supplying current to welding electrodes adapted to have contact with moving metallic edges of limited length, said system comprising a homopolar generator adapted to deliver currents of the magnitude necessary to weld said edges as they engage said electrodes at relatively high speed, a low inductance circuit connecting said generator to said electrodes, and a circuit breaker in said circuit, the inductance of said circuit being such, relative to the resistance thereof, that full welding current flows between said electrodes substantially instantaneously upon the closing of said circuit breaker after engagement of the electrodes by said edges, and is terminated substantially instantaneously on the opening thereof.

3. An electrical system for supplying current to welding electrodes adapted to have contact with moving metallic edges of limited length, said system comprising a homopolar generator adapted to deliver currents of the magnitude necessary to weld said edges as they engage said electrodes at relatively high speed, a low inductance circuit connecting said generator to said electrodes, and a circuit breaker in said circuit, the inductance of said circuit being such, relative to the resistance thereof, that the welding current builds up to 95% of its ultimate value in less than 0.5 second after the closing of said switch, whereby the weld may be started close to the end of said edges, and end scrap loss kept to a minimum.

CARL G. JONES.